United States Patent
Tachikawa et al.

(10) Patent No.: US 8,223,718 B2
(45) Date of Patent: Jul. 17, 2012

(54) RADIO TERMINAL, RADIO BASE STATION AND RADIO COMMUNICATION METHOD

(75) Inventors: Hitoya Tachikawa, Yokohama (JP); Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 496 days.

(21) Appl. No.: 12/488,408

(22) Filed: Jun. 19, 2009

(65) Prior Publication Data

US 2009/0316661 A1    Dec. 24, 2009

(30) Foreign Application Priority Data

Jun. 20, 2008    (JP) ................................. 2008-162233

(51) Int. Cl.
*H04Q 7/00* (2006.01)
(52) U.S. Cl. ........................................................ 370/331
(58) Field of Classification Search ........................ None
See application file for complete search history.

(56) References Cited

U.S. PATENT DOCUMENTS

| 6,757,251 | B1 * | 6/2004 | Nakaishi | 370/236.2 |
| 2010/0015980 | A1 * | 1/2010 | Seta et al. | 455/436 |

FOREIGN PATENT DOCUMENTS

| JP | 2007-281623 | 10/2007 |
| JP | 2007-311952 | 11/2007 |
| WO | WO-2006/012377 | 2/2006 |

OTHER PUBLICATIONS

Office Action from Japanese Patent Application No. 2008-162233, mailed on Aug. 24, 2010.

* cited by examiner

*Primary Examiner* — Hassan Phillips
*Assistant Examiner* — Prenell Jones
(74) *Attorney, Agent, or Firm* — Morrison & Foerster LLP

(57) ABSTRACT

Disclosed is a radio terminal including: a message transmitter-receiver configured to transmit and receive an IEEE 802.21 message using a protocol of a layer lower than an IP layer to and from a target radio base station for handover before an IP address acquisition unit acquires a new IP address; and a quality measurement unit configured to measure a radio communication quality including at least one of transmission delay and jitter in a radio communication path between the radio terminal and the target radio base station by using the IEEE 802.21 message transmitted and received by the message transmitter-receiver.

15 Claims, 10 Drawing Sheets

FIG. 6

MIH_Link_QoS_Parameters_Measure.request (
　　DestinationIdentifier,
　　LinkIdentifier,
　　Parameterslist
　　Destination IP Address
)

| NAME | TYPE | VALID RANGE | DESCRIPTION |
|---|---|---|---|
| DestinationIdentifier | MIHF ID | N/A | IDENTIFIER OF LOCAL OR REMOTE MIHF WHICH IS DESTINATION OF THE REQUEST |
| LinkIdentifier | LINK ID | N/A | IDENTIFIER OF LINK TO BE MEASURED |
| Parameterslist | LIST | N/A | LIST OF Link_QoS_Parameters_Measure |
| Destination IP Address | IP-ADDRESS | N/A | IP ADDRESS OF CN |

Link_QoS_Parameters_Measure.request (
    DestinationIdentifier,
    LinkIdentifier,
    Parameterslist
    Measurement_Time,
    Period,
    Packet_Length
    Original Timestamp
    Receive Timestamp
    Transit Timestamp
)

| NAME | TYPE | VALID RANGE | DESCRIPTION |
|---|---|---|---|
| DestinationIdentifier | MIHF ID | N/A | IDENTIFIER OF LOCAL OR REMOTE MIHF WHICH IS DESTINATION OF THE REQUEST |
| LinkIdentifier | LINK ID | N/A | IDENTIFIER OF LINK TO BE MEASURED |
| Parameterslist | LIST | N/A | LIST OF Link Parameters Measurement |
| Measurement_Time | INTEGER | | MEASUREMENT TIME |
| Period | INTEGER | | TRANSMISSION TIME |
| Packet_Length | INTEGER | | PACKET LENGTH OF ICMP |
| Original Timestamp | CHAR(4) | | TIME STARTING FROM 12:00AM MIDNIGHT (UTC) IS PROVIDED IN UNITS OF MILLISECONDS WHEN SOURCE MIHF TRANSMITS MESSAGE |
| Receive Timestamp | CHAR(4) | | TIME STARTING FROM 12:00AM MIDNIGHT (UTC) IS PROVIDED IN UNITS OF MILLISECONDS WHEN DESTINATION MIHF RECEIVES MESSAGE |
| Transit Timestamp | CHAR(4) | | TIME STARTING FROM 12:00AM MIDNIGHT (UTC) IS PROVIDED IN UNITS OF MILLISECONDS WHEN DESTINATION MIHF FORWARDS RESPONSE |

FIG. 7A

Link-QoS-Parameters-Measure.confirm (
    SourceIdentifier,
    LinkIdentifier,
    Parameterslist
    Measurement-Time,
    Period,
    Packet-Length
    Original Timestamp
    Receive Timestamp
    Transit Timestamp
)

Link_QoS_Parameters_Measure_Result.indication (
    SourceIdentifier ,
    LinkIdentifier ,
    LinkQoSParametersMeasuredList
    )

| NAME | TYPE | VALID RANGE | DESCRIPTION |
|---|---|---|---|
| SourceIdentifier | MIHF ID | N/A | IDENTIFIER OF LOCAL OR REMOTE MIHF WHICH IS DESTINATION OF THE REQUEST |
| LinkIdentifier | LINK ID | N/A | IDENTIFIER OF LINK TO BE MEASURED |
| LinkQoSParametersMeasuredList | LIST | N/A | LIST OF Link_QoS_Parameters_Measurement_Result |

FIG. 8B

| NAME | LENGTH | DESCRIPTION |
|---|---|---|
| LinkQoSParameters MeasuredList Type | 2 OCTETS | TYPES OF PARAMETERS TO BE FORMED<br>For 1st octet<br>0 bit : AVERAGE UPLINK DELAY<br>1 bit : AVERAGE DOWNLINK DELAY<br>2 bit : MAXIMUM UPLINK DELAY<br>3 bit : MAXIMUM DOWNLINK DELAY<br>4 bit : MAXIMUM UPLINK DELAY<br>5 bit : MAXIMUM DOWNLINK DELAY<br>6 bit : STANDARD DEVIATION OF UPLINK DELAY<br>7 bit : STANDARD DEVIATION OF DOWNLINK DELAY<br>For 2nd octet<br>0 bit : AVERAGE UPLINK JITTER<br>1 bit : AVERAGE DOWNLINK JITTER<br>2 bit : MAXIMUM UPLINK JITTER<br>3 bit : MAXIMUM DOWNLINK JITTER<br>4 bit : MAXIMUM UPLINK JITTER<br>5 bit : MAXIMUM DOWNLINK JITTER<br>6 bit : STANDARD DEVIATION OF UPLINK JITTER<br>7 bit : STANDARD DEVIATION OF DOWNLINK JITTER |
| LinkQoSParameters MeasuredList Value | 32 OCTETS | MEASURED LINK QoS PARAMETER VALUE |

FIG. 8C

| SYNTAX | LENGTH | NOTES |
|---|---|---|
| Average Uplink Delay | 2 OCTETS | AVERAGE UPLINK DELAY MEASURED FOR SPECIFIC LINK |
| Average Downlink Delay | 2 OCTETS | AVERAGE DOWNLINK DELAY MEASURED FOR SPECIFIC LINK |
| Maximum Uplink Delay | 2 OCTETS | MAXIMUM UPLINK DELAY MEASURED FOR SPECIFIC LINK |
| Maximum Downlink Delay | 2 OCTETS | MAXIMUM DOWNLINK DELAY MEASURED FOR SPECIFIC LINK |
| Minimum Uplink Delay | 2 OCTETS | MAXIMUM UPLINK DELAY MEASURED FOR SPECIFIC LINK |
| Minimum Downlink Delay | 2 OCTETS | MAXIMUM DOWNLINK DELAY MEASURED FOR SPECIFIC LINK |
| Standard Deviation of Uplink Delay | 2 OCTETS | STANDARD DEVIATION OF UPLINK DELAY FOR SPECIFIC LINK |
| Standard Deviation of Downlink Delay | 2 OCTETS | STANDARD DEVIATION OF DOWNLINK DELAY FOR SPECIFIC LINK |
| Average Uplink Jitter | 2 OCTETS | AVERAGE UPLINK JITTER MEASURED FOR SPECIFIC LINK |
| Average Downlink Jitter | 2 OCTETS | AVERAGE DOWNLINK JITTER MEASURED FOR SPECIFIC LINK |
| Maximum Uplink Jitter | 2 OCTETS | MAXIMUM UPLINK JITTER MEASURED FOR SPECIFIC LINK |
| Maximum Downlink Jitter | 2 OCTETS | MAXIMUM DOWNLINK JITTER MEASURED FOR SPECIFIC LINK |
| Minimum Uplink Jitter | 2 OCTETS | MAXIMUM UPLINK JITTER MEASURED FOR SPECIFIC LINK |
| Minimum Downlink Jitter | 2 OCTETS | MAXIMUM DOWNLINK JITTER MEASURED FOR SPECIFIC LINK |
| Standard Deviation of Uplink Jitter | 2 OCTETS | STANDARD DEVIATION OF UPLINK JITTER FOR SPECIFIC LINK |
| Standard Deviation of Downlink Jitter | 2 OCTETS | STANDARD DEVIATION OF DOWNLINK JITTER FOR SPECIFIC LINK |

RADIO TERMINAL, RADIO BASE STATION AND RADIO COMMUNICATION METHOD

CROSS REFERENCE TO RELATED APPLICATION

This application is based upon and claims the benefit of priority from the prior Japanese Patent Applications No. 2008-162233 filed on Jun. 20, 2008; the entire contents of which are incorporated herein by reference.

BACKGROUND OF THE INVENTION

1. Field of the Invention

The present invention relates to a radio terminal, a radio base station and a radio communication method capable of measuring transmission delay, jitter or the like.

2. Description of the Related Art

Heretofore, a communication quality measurement technique using an IP (Internet Protocol) packet has been widely used for measuring a quality of communications in a communication path between communication devices in a communication system (hereinafter, simply referred to as a "communication quality") Here, the communication quality includes transmission delay, jitter or the like. The transmission delay is the amount of time equivalent to a time lag between the transmission time and the reception time of a packet. The jitter is a value indicating the amount of variation (fluctuation) in the transmission delay.

For example, the transmission delay and the jitter are measured by using a timestamp added to an IP packet. With such a communication quality measurement technique, a communication device measures a communication quality and performs communication control adaptive to the communication quality (hereinafter referred to as "adaptive communication control"). Such adaptive communication control includes adaptive buffer control for adaptively controlling the size of a receiving buffer absorbing jitter (what is called a jitter buffer).

In addition, in recent years, along with advancement in radio communication techniques, a radio terminal such as a cellular phone terminal has become connectable to multiple radio communication networks using different radio communication schemes. When a radio terminal executes handover from a certain radio communication network to another radio communication network, the radio terminal acquires a new IP address (care of address, for example) (refer to Japanese Patent Application Publication No. 2007-311952).

In the meantime, the header of an IP packet normally includes a source IP address and a destination IP address. For this reason, in order to transmit and receive an IP packet, each of communication devices on the transmission side and the receiving side needs to acquire an IP address.

In the conventional communication quality measurement technique, the communication quality is measured by using an IP packet. Accordingly, when a radio terminal is assigned a new IP address at the time of handover, the following problem occurs.

Specifically, until acquiring a new IP address, the radio terminal cannot transmit and receive an IP packet to and from a correspondent node (CN) via a target radio communication network (target radio base station) for handover. For this reason, the communication quality between the radio terminal and the CN via the target radio base station for handover cannot be measured. This leads to a problem that the adaptive communication control cannot be started until the radio terminal acquires the new IP address.

In particular, transmission delay and jitter in a radio communication path between the radio terminal and the radio base station are dominant in the transmission quality in the communication path between the radio terminal and the CN. Thus, it is preferable to make measurable the communication quality such as the transmission delay and the jitter in the radio communication path (hereinafter, referred to as a "radio communication quality").

SUMMARY OF THE INVENTION

The present invention is thus made to solve the aforementioned problem. An objective of the present invention is to provide a radio terminal, a radio base station and a radio communication method capable of measuring a radio communication quality between a target radio base station and a radio terminal before the radio terminal acquires a new IP address when the radio terminal is assigned the new IP address at the time of handover.

A first aspect of the radio terminal of the present invention is a radio terminal (for example, radio terminal 100) comprising: a communication processor (for example, up entity 155) configured to execute communications using an IP address with a CN via a first radio base station (for example, radio base station PoA1); an IP address acquisition unit (for example, IP address acquisition unit 152) configured to acquire a new IP address at the time of handover from the first radio base station to a second radio base station, the new IP address being used for communications with the CN via the second radio base station (for example, radio base station PoA2); a message transmitter-receiver (for example, message transmitter-receiver 131) configured to transmit and receive a lower layer message (for example, IEEE 802.21 message) using a protocol of a layer lower than an IP layer to and from the second radio base station before the IP address acquisition unit acquires the new IP address; and a quality measurement unit (for example, quality measurement unit 132) configured to measure a radio communication quality including at least one of transmission delay and jitter in a radio communication path (for example, radio communication path P1) between the radio terminal and the second radio base station, by using the lower layer message transmitted and received by the message transmitter-receiver.

According to the radio terminal, the message transmitter-receiver transmits and receives a lower layer message using a protocol of a layer lower than an IP layer to and from the second radio base station before the IP address acquisition unit acquires a new IP address. Then, the quality measurement unit measures the radio communication quality by using the lower layer message transmitted and received by the message transmitter-receiver.

Accordingly, it is possible to provide a radio terminal capable of measuring the radio communication quality prior to acquisition of a new IP address even in a case where the radio terminal is assigned the new IP address at the time of handover.

A second aspect of the radio terminal of the present invention relates to the first aspect, wherein the lower layer message includes information on any one of a transmission time at which the lower layer message is transmitted and a reception time at which the lower layer message is received, and the quality measurement unit measures the radio communication quality on the basis of a time lag between the transmission time and the reception time.

A third aspect of the radio terminal of the present invention relates to the first aspect, wherein the radio terminal further comprises: a quality determination unit (for example, quality measurement unit 132) configured to determine an overall communication quality including at least one of transmission delay and jitter in an overall communication path between the radio terminal and the CN, wherein the message transmitter-receiver transmits the lower layer message to the second radio base station, the lower layer message requesting measurement of a network communication that includes at least one of transmission delay and jitter in a communication path (for example, wired communication path P2) between the second radio base station and the CN, the message transmitter-receiver receives the lower layer message from the second radio base station, the lower layer message informing of a result of the measurement of the network communication quality, and the quality determination unit determines the overall communication quality on the basis of the radio communication quality measured by the quality measurement unit and the network communication quality informed by the second radio base station.

A fourth aspect of the radio terminal of the present invention relates to the third aspect, wherein the message transmitter-receiver transmits the lower layer message to the second radio base station, the lower layer message informing of any one of the radio communication quality measured by the quality measurement unit and the overall communication quality determined by the quality determination unit.

A fifth aspect of the radio terminal of the present invention relates to the first aspect, wherein the radio terminal further comprises a link establishing unit (for example, WiMAX link controller 116) configured to establish a radio link with the second radio base station by using a protocol of a link layer before the IP address acquisition unit acquires the new IP address, wherein the message transmitter-receiver starts transmission and reception of the lower layer message upon completion of the establishing of the radio link by the link establishing unit.

A sixth aspect of the radio terminal of the present invention relates to the first aspect, wherein the IP address acquisition unit acquires the new IP address at the time of handover executed between radio communication networks (for example, EV-DO network 1, WiMAX network 2) using different radio communication schemes.

A seventh aspect of the radio terminal of the present invention relates to the radio terminal, wherein the protocol used for transmitting and receiving the lower layer message is a protocol defined in IEEE 802.21.

A first aspect of the radio base station of the present invention is a radio base station (for example, radio base station PoA2) being a target for handover by a radio terminal (for example, radio terminal 100) that executes communications using an IP address with a CN and also acquires a new IP address at the time of handover from another radio base station (for example, radio base station PoA1) to the radio base station, the radio base station comprising: a message transmitter-receiver (for example, message transmitter-receiver 231) configured to transmit and receive a lower layer message (for example, IEEE 802.21 message) using a protocol of a layer lower than an IP layer to and from the radio terminal before the radio terminal acquires the new IP address; and a quality measurement unit (for example, quality measurement unit 232) configured to measure a radio communication quality including at least one of transmission delay and jitter in a radio communication path (for example, radio communication path P1) between the radio terminal and the radio base station, by using the lower layer message transmitted and received by the message transmitter-receiver.

According to the radio base station, the message transmitter-receiver transmits and receives a lower layer message using a protocol of a layer lower than an IP layer to and from the radio terminal before the radio terminal acquires the new IP address. Then, the quality measurement unit measures the radio communication quality by using the lower layer message transmitted and received by the message transmitter-receiver.

Accordingly, it is possible to provide a radio base station capable of measuring the radio communication quality prior to acquisition of the new IP address even in a case where the radio terminal is assigned the new IP address at the time of handover.

A second aspect of the radio base station of the present invention relates to the first aspect of the radio base station, wherein the lower layer message includes information on any one of a transmission time at which the lower layer message is transmitted and a reception time at which the lower layer message is received, and the quality measurement unit measures the radio communication quality on the basis of a time lag between the transmission time and the reception time.

A third aspect of the radio base station of the present invention relates to the first aspect of the radio base station, wherein the message transmitter-receiver transmits the lower layer message to any one of the radio terminal and the CN, the lower layer message informing of the radio communication quality measured by the quality measurement unit.

A fourth aspect of the radio base station of the present invention relates to the first aspect of the radio base station, wherein the message transmitter-receiver receives the lower layer message from the radio terminal, the lower layer message requesting measurement of a network communication quality including at least any one of transmission delay and jitter in a communication path (for example, wired communication path P2) between the radio base station and the CN, the quality measurement unit measures the network communication quality when the message transmitter-receiver receives the lower layer message requesting the measurement of the network communication quality from the radio terminal, and the message transmitter-receiver transmits the lower layer message to the radio terminal, the lower layer message informing of a result of the measurement of the network communication quality measured by the quality measurement unit.

A fifth aspect of the radio base station of the present invention relates to the fourth aspect of the radio base station, wherein the quality measurement unit measures the network communication quality by using any one of the lower layer message and an ICMP packet.

A sixth aspect of the radio base station of the present invention relates to the first aspect of the radio base station wherein the radio base station further comprises: a quality storage unit (for example, storage unit 260) configured to previously store a network communication quality including at least one of transmission delay and jitter in a communication path (for example, wired communication path P2) between the radio base station and the CN, wherein the message transmitter-receiver transmits the lower layer message, informing of the network communication quality previously stored in the quality storage unit, to the radio terminal upon receipt of the lower layer message requesting transmission of the network communication quality from the radio terminal.

A seventh aspect of the radio base station of the present invention relates to the first to sixth aspects of the radio base station wherein the protocol used for transmitting and receiving the lower layer message is a protocol defined by IEEE 802.21.

An aspect of the radio communication method of the present invention is a radio communication method comprising the steps of: executing, at a radio terminal, communications using an IP address with a CN via a first radio base station; acquiring, at the radio terminal, a new IP address at the time of handover from the first radio base station to a second radio base station, the new IP address used for communications with the CN via the second radio base station; transmitting and receiving a lower layer message using a protocol of a layer lower than an IP layer between the radio terminal and the second radio base station before the radio terminal acquires the new IP address; and measuring a radio communication quality including at least one of transmission delay and jitter in a radio communication path between the radio terminal and the second radio base station, by using the lower layer message transmitted and received in the step of transmitting and receiving the lower layer message.

According to the present invention, it is possible to provide a radio terminal, a radio base station and a radio communication method capable of measuring a radio communication quality between a target radio base station and a radio terminal before the radio terminal acquires a new IP address even in a case where the radio terminal is assigned the new IP address at the time of handover.

BRIEF DESCRIPTION OF THE DRAWINGS

FIG. 6 is a diagram showing an example of MIH_Link_QoS_Parameters_Measure.request according to the first embodiment of the present invention.

FIGS. 7A and 7B are diagrams respectively showing examples of Link_QoS_Parameters_Measure.request and Link_QoS_Parameters_Measure.confirm according to the first embodiment of the present invention.

FIGS. 8A, 8B and 8C illustrate an example of Link_QoS_Parameters_Measure_Result.indication according to the first embodiment of the present invention.

DESCRIPTION OF THE EMBODIMENTS

Figure 1:
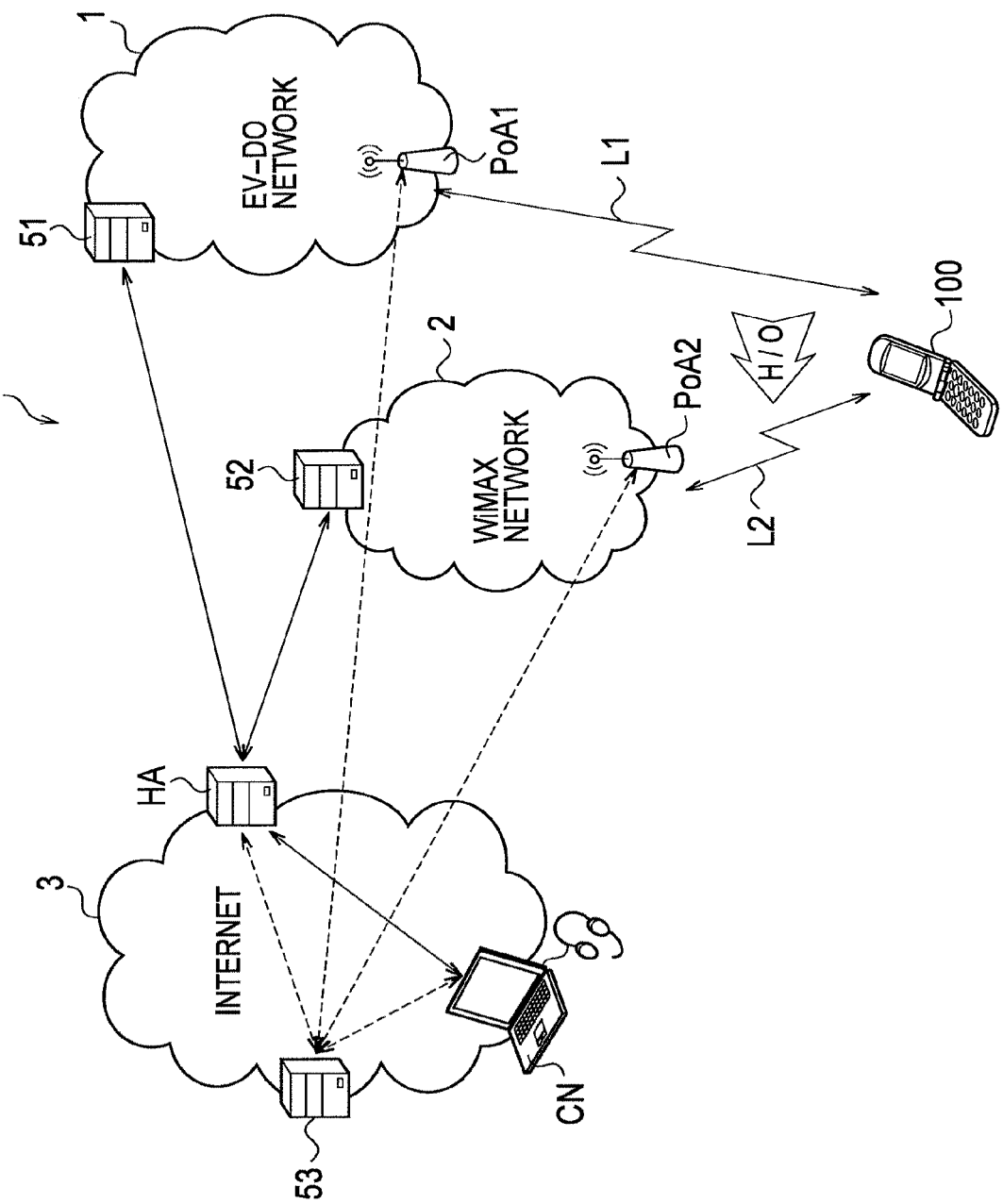
FIG. 1 is an overall configuration diagram of a communication system according to a first embodiment of the present invention.

Next, first to third embodiments of the present invention will be described with reference to the drawings. Note that, hereinafter, the same or similar reference numerals are given to denote the same or similar portions in the descriptions of the drawings in the first to third embodiments.

[First Embodiment]

In the first embodiment, descriptions will be given as follows: (1) schematic configuration of communication system, (2) detailed configuration of communication system, (3) detailed operation of communication system, (4) details of messages and (5) effects and advantages.

(1) Schematic Configuration of Communication System

Firstly, descriptions will be given of (1.1) overall configuration of communication system and (1.2) schematic configurations of radio terminal, radio base station and CN.

(1.1) Overall Configuration of Communication System

FIG. 1 is an overall configuration diagram of a communication system 10 according to the first embodiment.

A radio terminal 100 shown in FIG. 1 is configured to be connectable to multiple radio communication networks of different radio communication schemes (configurations of physical layers or link layers). The radio terminal 100 is a mobile terminal (Mobile Node or Mobile Router). In the first embodiment, the radio terminal 100 is capable of executing radio communications by connecting to any of an EV-DO network 1 and a WiMAX network 2.

The EV-DO network 1 is the third-generation cellular phone network using a CDMA scheme. Specifically, the EV-DO network 1 is a radio communication network compliant with cdma2000 1x-EVDO for executing IP packet communications (hereinafter, referred to as "EV-DO").

The EV-DO network 1 includes a radio base station PoA1 executing radio communications with the radio terminal 100 and a gateway 51 functioning as an entrance and exit of the EV-DO network 1. The radio base station PoA1 is a base station (Point of Access) operating in accordance with EV-DO. The radio terminal 100 is capable of establishing a radio link L1 with the radio base station PoA1 and thereby executing radio communications via the radio link L1.

The WiMAX network 2 is a wireless MAN (Metropolitan Area Network) in accordance with IEEE 802.16e, that is, a radio communication network employing WiMAX. The WiMAX network 2 allows IP packet communications as in the case of EV-DO, and provides faster communications than EV-DO.

The WiMAX network 2 includes a radio base station PoA2 executing radio communications with the radio terminal 100 and a gateway 52 functioning as an entrance and exit of the WiMAX network 2. The radio base station PoA2 is a base station (Point of Access) operating in accordance with WiMAX. The radio terminal 100 is capable of establishing a radio link L2 with the radio base station PoA2 and thereby executing radio communications via the radio link L2.

In the example shown in FIG. 1, the radio terminal 100 executes handover from the EV-DO network 1 to the WiMAX network 2. The communication system 10 employs Mobile IP (RFC 3775) or NEMO Basic Support (RFC 3963) to allow such handover between the networks to be continued without disconnecting IP packet communications. In this embodiment, descriptions will be given of the communication system 10 employing Mobile IP.

The EV-DO network 1 and the WiMAX network 2 are connected to the Internet 3. A CN, a home agent HA and an NTP server 53 are connected to the Internet 3. In this embodiment, the CN is a communication counterpart of the radio terminal 100, and is a terminal using Voice over IP (VoIP). The CN transmits and receives an IP packet via the Internet 3.

The home agent HA is a home agent compliant with Mobile IP. The home agent HA stores therein a home address (HoA) and a care of address (CoA) of the radio terminal 10 in association with each other. The home address is a static IP address of the radio terminal 100, and the care of address is a temporary address of the radio terminal 100.

Specifically, when assigned a CoA at the time of handover, the radio terminal 100 registers a set of the HoA and CoA in the home agent HA. Upon receipt of an IP packet addressed to the HoA of the radio terminal 100 from the CN, the home agent HA converts the HoA into the CoA and relays the IP packet to the radio terminal 100 by using IP tunneling technology.

The NTP server 53 periodically informs the CN, the home agent HA, the radio base station PoA1 and the radio base station PoA2 of time information and synchronizes these devices. The radio terminal 100 synchronizes with the others by using a built-in GPS.

In the first embodiment, the radio terminal 100 transmits and receives an IP packet to and from the CN by using any one of the WiMAX network 2 and the EV-DO network 1. In this embodiment, for the sake of convenience in the description, an assumption is made that the radio terminal 100 cannot secure a desired RSSI or SNR with the EV-DO network 1, so that the radio terminal 100 executes handover from the EV-DO network 1 to the WiMAX network 2.

For the handover from the EV-DO network 1 to the WiMAX network 2, the radio terminal 100 establishes the radio link L2 with the radio base station PoA2 of the WiMAX network 2 and disconnects the radio link L1 established with the radio base station PoA1 of the EV-DO network 1, thereby executing handover at the link layer (layer 2) level (hereinafter, referred to as a "link layer handover").

Upon completion of the link layer handover, the radio terminal 100 acquires a CoA assigned from the WiMAX network 2 and registers the HoA and the CoA in the home agent HA, thereby executing handover at the IP layer (layer 3) level (hereinafter, referred to as an "IP layer handover").

Figure 2:
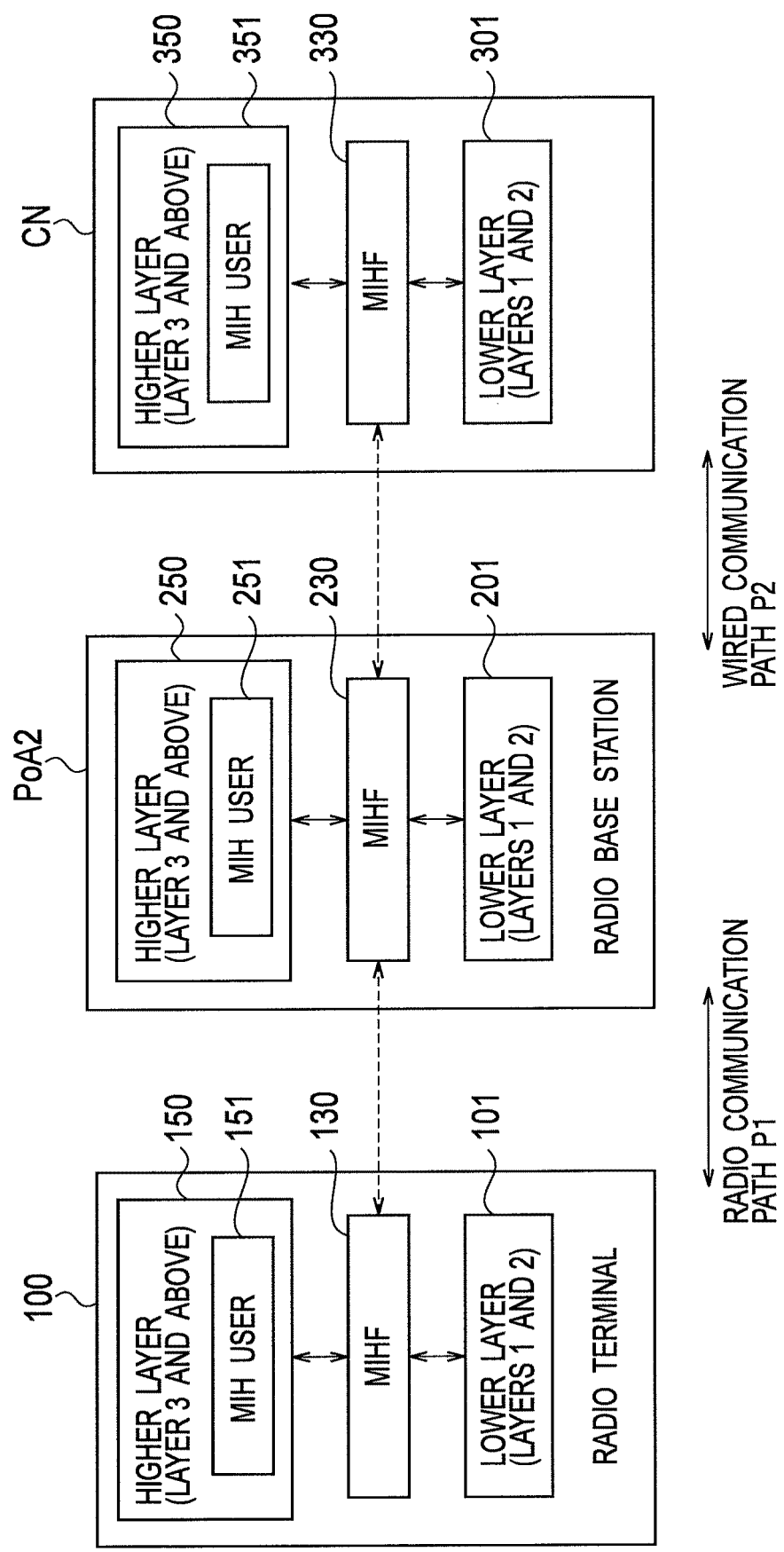
FIG. 2 is a schematic configuration diagram of a radio terminal, a radio base station and a CN according to the first embodiment of the present invention.

When the radio terminal 100 establishes the radio link L2 with the radio base station PoA2 of the WiMAX network 2, the radio terminal 100 and the radio base station PoA2 measure a radio communication quality of a radio communication path P1 located between the radio terminal 100 and the radio base station PoA2 (refer to FIG. 2).

In addition, when the radio terminal 100 establishes the radio link L2 with the radio base station PoA2 of the WiMAX network 2, the radio base station PoA2 and the CN measure a communication quality of a wired communication path P2 located between the radio base station PoA2 and the CN (hereinafter, referred to as a network communication quality) by causing the radio terminal 100 to inform the radio base station PoA2 of the IP address of the CN (refer to FIG. 2). Here, the network communication quality may be a communication quality between the radio base station PoA2 and the home agent HA.

Note that, although the communication quality includes at least one of transmission delay and jitter, the radio terminal 100, the radio base station PoA2 and the CN are assumed to measure both of the transmission delay and the jitter in this embodiment.

(1.2) Schematic Configurations of Radio Terminal, Radio Base Station and CN

FIG. 2 shows the respective schematic configuration diagrams of the radio terminal 100, the radio base station PoA2 and the CN. Note that, FIG. 2 also shows the respective protocol stack diagrams of the radio terminal 100, the radio base station PoA2 and the CN. As shown in FIG. 2, each of the radio terminal 100, the radio base station PoA2 and the CN implements a protocol stack configuration compliant with IEEE 802.21.

The radio terminal 100 includes a lower layer 101 formed of physical layer and link layer protocols, an MIHF (Media Independent Handover Function) 130 and a higher layer 150 formed of protocols of an IP layer and higher layers. The higher layer 150 includes an MIH user 151 formed of an IP mobility protocol such as Mobile IP. The MIHF 130 is a protocol (entity) of a layer lower than the IP layer and functions as an interface between the protocol of the link layer and the IP mobility protocol.

The MIHF 130 accomplishes a media independent handover, which is independent of the configurations of the physical layers of the WiMAX network 2 and the EV-DO network 1. For example, the MIHF 130 executes handover (link layer handover) from the radio link L1 to the radio link L2 in response to an instruction from the MIH user 151. On the other hand, the MIH user 151 executes the aforementioned IP layer handover.

The respective protocol stacks of the radio base station PoA2 and the CN are configured in the same manner as that of the radio terminal 100. Specifically, the radio base station PoA2 includes an MIHF 230 and an MIH user 251, and the CN includes an MIHF 330 and an MIH user 351.

The MIHF 130 of the radio terminal 100 and the MIHF 230 of the radio base station PoA2 measure a radio communication quality by using a lower layer message based on IEEE 802.21 (hereinafter, referred to as an "IEEE 802.21 message" as appropriate). Specifically, an IEEE 802.21 message transmitted and received between the MIHF 130 of the radio terminal 100 and the MIHF 230 of the radio base station PoA2 includes at least any one of a timestamp of the transmission time of the IEEE 802.21 message and a time stamp of the reception time of the IEEE 802.21 message. Then, the MIHF 130 of the radio terminal 100 and the MIHF 230 of the radio base station PoA2 measure the radio communication quality on the basis of a difference between the transmission time and the reception time.

However, the present invention is not limited to the case where both of the MIHF 130 of the radio terminal 100 and the MIHF 230 of the radio base station PoA2 measure the radio communication quality. Instead, it is possible to employ a configuration in which only one of the MIHF 130 of the radio terminal 100 and the MIHF 230 of the radio base station PoA2 measures the radio communication quality and informs the other of the result of the measurement.

The MIHF 130 of the radio terminal 100 measures the radio communication quality between itself and the MIHF 230 of the radio base station PoA2 by using the IEEE 802.21 message. The result of the measurement of the radio communication quality may be managed by the MIHF 130 of the radio terminal 100, and may also be shared by the radio terminal 100 and the radio base station PoA2.

In addition, the MIHF 230 of the radio base station PoA2 and the MIHF 330 of the CN measure a network communication quality by using an IEEE 802.21 message. Upon receipt of a request from the MIHF 130 of the radio terminal 100, the MIHF 230 of the radio base station PoA2 specifies the CN (MIHF 330) from an IP address or an MIHF ID included in the request, and then measures the network communication quality.

Specifically, the IEEE 802.21 message transmitted and received between the MIHF 230 of the radio base station PoA2 and the MIHF 330 of the CN includes at least any one of a timestamp of the transmission time of the IEEE 802.21 message and a time stamp of the reception time of the IEEE 802.21 message. Then, the MIHF 230 of the radio base station PoA2 and the MIHF 330 of the CN measure the network communication quality on the basis of a difference between the transmission time and the reception time.

However, the present invention is not limited to the case where both of the MIHF 230 of the radio base station PoA2 and the MIHF 330 of the CN measure the network communication quality. Instead, it is possible to employ a configuration in which only one of the MIHF 230 of the radio base station PoA2 and the MIHF 330 of the CN measures the network communication quality and informs the other of the result of the measurement.

Moreover, the MIHF 230 of the radio base station PoA2 informs the radio terminal 100 of the network communication quality. When informed of the network communication quality from the MIHF 230 of the radio base station PoA2, the MIHF 130 of the radio terminal 100 determines a communication quality of the overall communication path between the radio terminal 100 and the CN (hereinafter, referred to as an "overall communication quality") on the basis of the informed network communication quality and the measured radio communication quality. The MIHF 130 of the radio terminal 100 may inform the MIHF 330 of the CN of the determined overall communication quality.

(2) Detailed Configuration of Communication System

Next, a detailed configuration of the communication system 10, that is, (2.1) configuration of radio terminal and (2.2) configuration of radio base station will be described. Note that, hereinafter, configurations related to the present invention will be mainly described.

(2.1) Configuration of Radio Terminal

Figure 3:
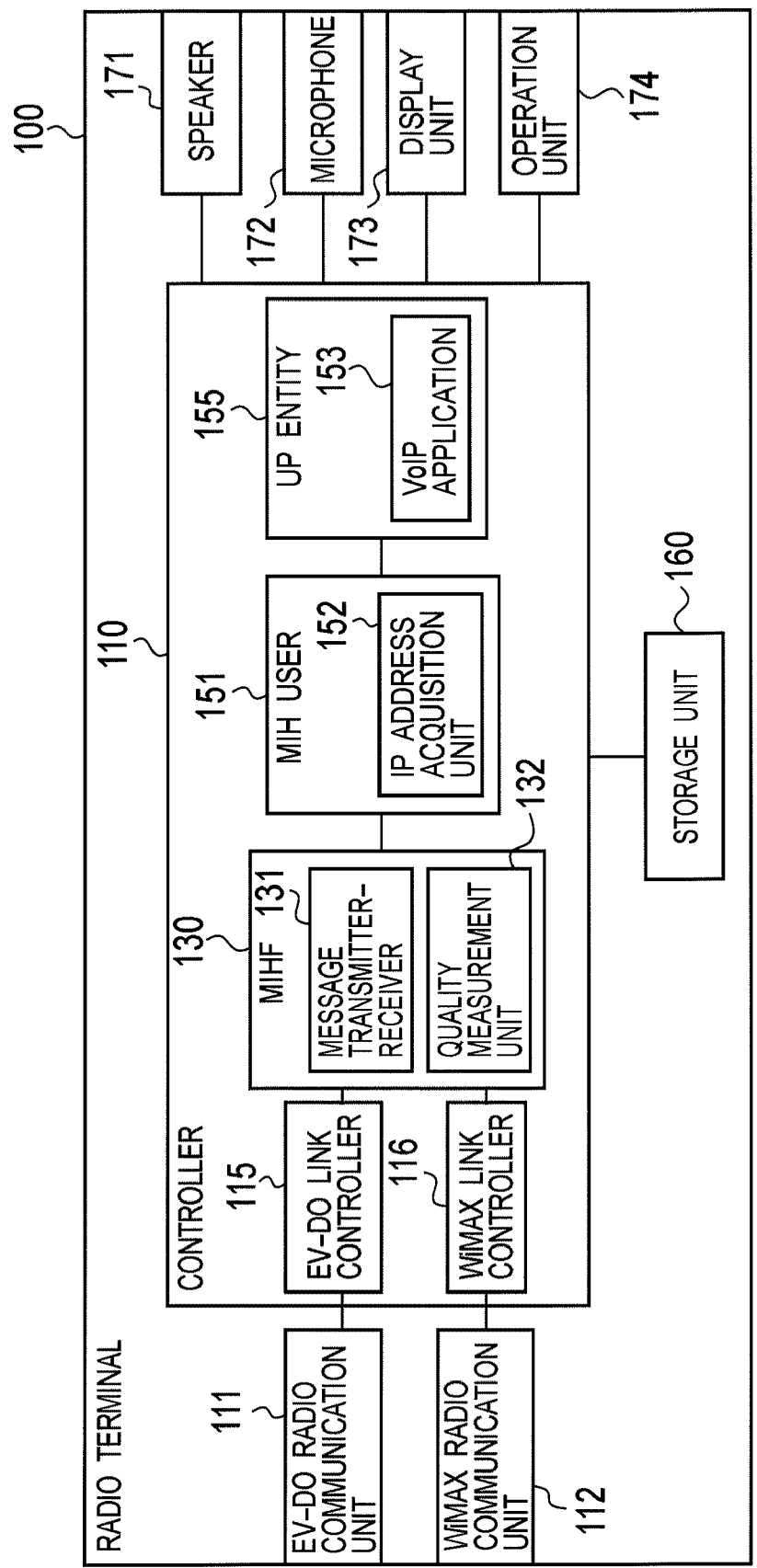
FIG. 3 is a block diagram showing a detailed configuration of the radio terminal according to the first embodiment of the present invention.

FIG. 3 is a block diagram showing a detailed configuration of the radio terminal 100. As shown in FIG. 3, the radio terminal 100 includes two different radio communication units, that is, an EV-DO radio communication unit 111 and a WiMAX radio communication unit 112 in order to execute radio communications by connecting to the EV-DO network 1 and the WiMAX network 2 at least having different physical layer schemes.

Each of the EV-DO radio communication unit 111 and the WiMAX radio communication unit 112 includes an LNA (Low Noise Amplifier), a power amplifier, an up converter, a down converter and the like, and transmits and receives a radio signal.

The radio terminal 100 further includes a controller 110, a storage unit 160, a speaker 171, a microphone 172, a display unit 173 and an operation unit 174.

The controller 110 is configured of a CPU, for example, and controls various functions included in the radio terminal 100. The storage unit 160 is configured of a memory, for example, and stores therein various information used for control or the like in the radio terminal 100.

The microphone 172 collects voice and inputs voice data based on the collected voice to the controller 110 via a voice codec (not shown). The speaker 171 outputs voice on the basis of the voice data acquired from the controller 110 via the voice codec (not shown).

The display unit 173 displays an image received via the controller 110 and also displays an operation content (such as an input phone number or address). The operation unit 174 is configured of a ten key, a function key and the like and used for inputting an operation content of the user.

The controller 110 includes an EV-DO link controller 115, a WiMAX link controller 116, the MIHF 130, the MIH user 151 and an up entity 155.

The EV-DO link controller 115 establishes the radio link L1 in a link layer with the radio base station PoA1 of the EV-DO network 1 in response to an instruction from the MIHF 130. Moreover, the EV-DO link controller 115 monitors various radio parameters (RSSI, SNR and the like) for the radio link L1 on the basis of a radio signal to be received from the radio base station PoA1 of the EV-DO network 1.

The WiMAX link controller 116 establishes the radio link L2 in a link layer with the radio base station PoA2 of the WiMAX network 2 in response to an instruction from the MIHF 130. Moreover, the WiMAX link controller 116 monitors various radio parameters (RSSI, SNR and the like) for the radio link L2 on the basis of a radio signal to be received from the radio base station PoA2 of the WiMAX network 2.

The MIHF 130 is a protocol located in a higher layer than the link layer as described above. The MIHF 130 includes a message transmitter-receiver 131 configured to transmit and receive an IEEE 802.21 message between itself and the MIHF 230 of the radio base station PoA2. The MIHF 130 also includes a quality measurement unit 132 configured to measure a radio communication quality by using the IEEE 802.21 message transmitted and received by the message transmitter-receiver 131. Moreover, the quality measurement unit 132 also functions to determine an overall communication quality on the basis of the network communication quality informed by the MIHF 230 of the radio base station PoA2 and the measured radio communication quality.

The MIH user 151 is located in a higher layer than that of the MIHF 130. In this embodiment, the MIH user 151 is configured of Mobile IP and the like. Specifically, the MIH user 151 includes an IP address acquisition unit 152 configured to acquire a new IP address (that is, CoA) used for communications performed with the CN via the radio base station PoA2 at the time of handover.

The up entity 155 is located in a higher layer than that of the MIH user 151. In this embodiment, the up entity 155 includes a VoIP application 153. The VoIP application 153 executes an adaptive buffer control for adjusting a jitter buffer provided in the storage unit 160, on the basis of the radio communication quality or the entire communication quality measured by the quality measurement unit 132. The jitter buffer is provided for absorbing jitter. The VoIP application 153 adjusts the size of the jitter buffer in accordance with the actual jitter.

(2.2) Configuration of Radio Base Station

Figure 4:
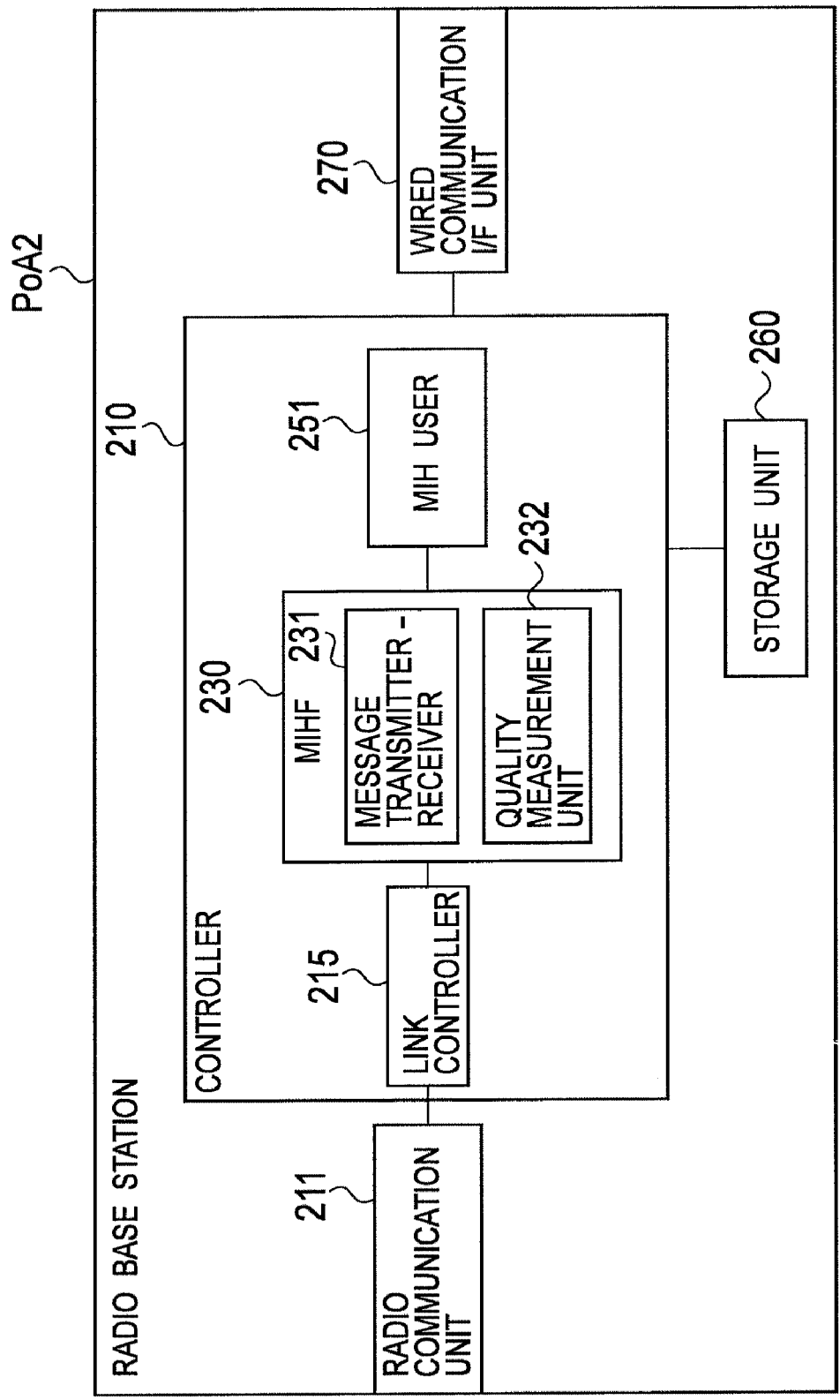
FIG. 4 is a block diagram showing a detailed configuration of the radio base station according to the first embodiment of the present invention.

FIG. 4 is a block diagram showing a detailed configuration of the radio base station PoA2. As shown in FIG. 4, the radio base station PoA2 includes a radio communication unit 211, a controller 210, a storage unit 260 and a wired communication I/F unit 270.

The radio communication unit 211 executes radio communications with the radio terminal 100 in accordance with WiMAX. The controller 210 is configured of a CPU, for example, and controls various functions included in the radio base station PoA2. The storage unit 260 is configured of a memory, for example, and stores therein various information used for control and the like in the radio base station PoA2. The wired communication I/F unit 270 is connected to the gateway 52 via a backbone network.

The controller 210 includes a link controller 215, the MIHF 230 and the MIH user 251. The MIHF 230 includes a message transmitter-receiver 231 and a quality measurement unit 232. The message transmitter-receiver 231 is configured to transmit and receive an IEEE 802.21 message to and from the MIHF 130 of the radio terminal 100 and the MIHF 330 of the CN. The quality measurement unit 232 is configured to measure a radio communication quality and a network communication quality by using the IEEE 802.21 message transmitted and received by the message transmitter-receiver 231.

(3) Detailed Operation of Communication System

Figure 5:
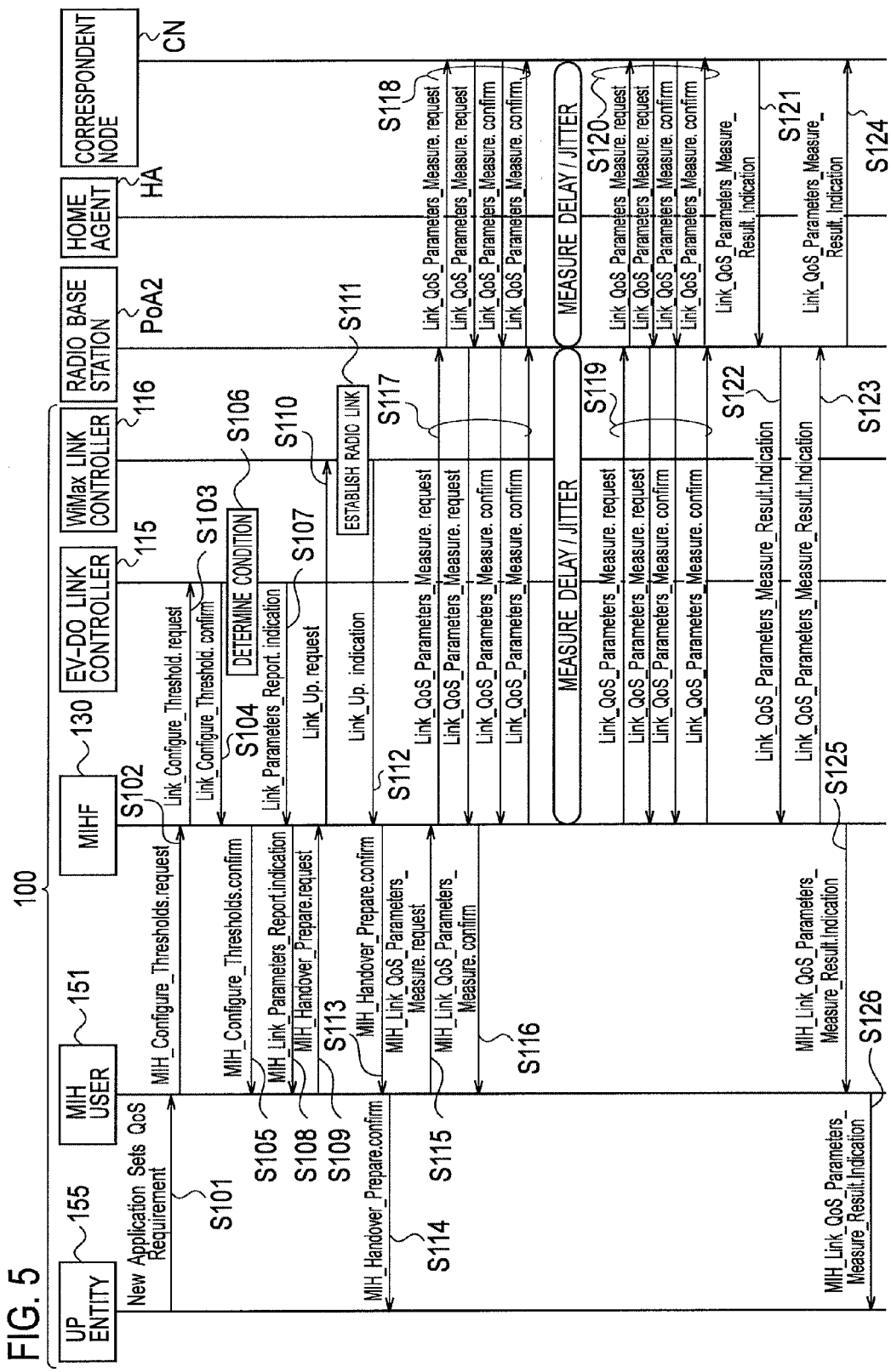
FIG. 5 is a sequence diagram showing an example of a detailed operation of the communication system according to the first embodiment of the present invention.

Next, a detailed operation of the communication system 10 will be described. FIG. 5 is a sequence diagram showing an example of the detailed operation of the communication system 10. Here, a description will be given of a first half of the operation of a link layer handover, and a description of the operation executed after the link layer handover such as an IP layer handover will be omitted.

The radio terminal 100 establishes the radio link L1, then determines handover to the WiMAX network 2, and instructs the WiMAX link controller 116 to establish the radio link L2 (Link up) as a preparation of the handover in steps S101 to S110.

Specifically, in step S101, the up entity 155 informs the MIH user 151 of a quality of service (QoS) required in the VoIP application 153.

In steps S102 and S103, the MIH user 151 informs the EV-DO link controller 115 via the MIHF 130 of a condition setting request (Link_configure_threshold.request) requesting the setting of a condition of radio parameters (RSSI, SNR and the like) corresponding to the informed QoS. With this request, whether or not to execute handover with the required QoS condition will be determined.

In steps S104 and S105, the EV-DO link controller 115 informs the MIH user 151 via the MIHF 130 of Link_Configure_Threshold.confirm indicating the completion of the setting of the condition.

In step S106, the EV-DO link controller 115 determines whether or not to execute the handover by determining if radio parameters of the radio link L1 monitored by itself satisfy the set condition. Here, an assumption is made that the radio parameters monitored by the EV-DO link controller 115 satisfy the set condition. Specifically, the operation in step S107 and thereafter shows an operation to be performed when the handover is determined to be executed.

In steps S107 and S108, the EV-DO link controller 115 informs the MIH user 151 via the MIHF 130 of Link_Parameters_Report.indication indicating the radio parameters of the radio link L1.

In step S109, the MIH user 151 informs the MIHF 130 of MIH_Handover_Prepare.request requesting preparation of the handover (Initiation Action). In step S110, the MIHF 130 informs the WiMAX link controller 116 of Link_Up.request requesting the establishing of the radio link L2.

In step S111, the WiMAX link controller 116 establishes the radio link L2. Note that, although a new IP address has not been acquired yet, the MIHF 130 and the MIHF 230 of the radio base station PoA2 become communicable with each other via the radio link L2.

In step S112, the WiMAX link controller 116 informs the MIHF 130 of Link_Up.indication indicating that the radio link L2 has been established.

In steps S113 and S114, the MIHF 130 informs the up entity 155 via the MIH user 151 of MIH_Handover_Prepare.confirm indicating the completion of the preparation of the handover (Initiation Action).

In step S115, the MIH user 151 informs the MIHF 130 of MIH_Link_QoS_Parameters_Measure.request requesting the measurement of a communication quality (overall communication quality, here). At this time, the MIH user 151 informs the MIHF 130 of the IP address of the CN.

In step S116, the MIHF 130 informs the MIH user 151 of MIH_Link_QoS_Parameters_Measure.Confirm indicating that the measurement of the communication quality has been started.

In steps S117 and S119, the MIHF 130 and the MIHF 230 of the radio base station PoA2 transmit and receive Link_QoS_Parameters_Measure.request requesting the measurement of the communication quality and Link_QoS_Parameters_Measure.confirm indicating the result of the measurement of the communication quality to and from each other.

Link_QoS_Parameters_Measure.request and Link_QoS_Parameters_Measure.confirm include timestamps added by the MIHF 130 and the MIHF 230 of the radio base station PoA2. The MIHF 130 and the MIHF 230 of the radio base station PoA2 measure the radio communication quality on the basis of the timestamps and then save the measured radio communication quality.

In steps S118 and S120, the MIHF 230 of the radio base station PoA2 and the MIHF 330 of the CN transmit and receive Link_QoS_Parameters_Measure.request requesting the measurement of the communication quality and Link_QoS_Parameters_Measure.confirm indicating the result of the measurement of the communication quality to and from each other.

Link_QoS_Parameters_Measure.request and Link_QoS_Parameters_Measure.confirm include timestamps added by the MIHF 230 of the radio base station PoA2 and the MIHF 330 of the CN. The MIHF 230 of the radio base station PoA2 and the MIHF 330 of the CN measure the network communication quality on the basis of the timestamps and then save the measured network communication quality.

In step S121, the MIHF 330 of the CN informs the MIHF 230 of the radio base station PoA2 of Link_QoS_Parameters_Measure_Result.indication indicating the result of the measurement of the network communication quality.

In step S122, the MIHF 230 of the radio base station PoA2 informs the MIHF 130 of the radio terminal 100 of Link_QoS_Parameters_Measure_Result.indication indicating the result of the measurement of the network communication quality and the network communication quality notified by the MIHF 330 of the CN.

As a result of the aforementioned processing, the MIHF 130 of the radio terminal 100 can determine the overall communication quality from the measured radio communication quality and the notified network communication quality.

In step S123, the MIHF 130 of the radio terminal 100 informs the MIHF 230 of the radio base station PoA2 of Link_QoS_Parameters_Measure_Result.indication indicating the result of the measurement of the radio communication quality.

In step S124, the MIHF 230 of the radio base station PoA2 informs the MIHF 330 of the CN of Link_QoS_Parameters_Measure_Result.indication indicating the result of the measurement of the radio communication quality and the radio communication quality notified by the MIHF 130 of the radio terminal 100.

Thereby, the MIHF 330 of the CN can determine the overall communication quality from the measured network communication quality and the notified radio communication quality.

In step S125, the MIHF 130 of the radio terminal 100 informs the up entity 155 via the MIH user 151 of MIH_Link_Parameters_Measure_Result.indication indicating the result of the measurement of the overall communication quality, the up entity 155 being the requester of the communication quality.

(4) Details of Message

Next, with reference to FIGS. 6 to 8, descriptions will be given of details of each of the aforementioned IEEE 802.21 messages (MIH_Link_QoS_Parameters_Measure.request, Link_QoS_Parameters_Measure.request, Link_QoS_Parameters_Measure.confirm, Link_QoS_Parameters_Measure_Result.indication and MIH_Link_Parameters_Measure_Result.indication).

FIG. 6 is a table showing an example of MIH_Link_QoS_Parameters_Measure.request. In step S115 of FIG. 5, the MIH user 151 notifies the MIHF 130 of MIH_Link_QoS_Parameters_Measure.request.

In the example of FIG. 6, MIH_Link_QoS_Parameters_Measure.request includes "DestinationIdentifier" for identifying the MIHF 230 of the radio base station PoA2 and "Destination IP Address" which is the IP address of the CN.

FIG. 7A is a table showing an example of Link_QoS_Parameters_Measure.request. In steps S117 to S120 of FIG. 5, Link_QoS_Parameters_Measure.request is transmitted and received.

In the example of FIG. 7A, Link_QoS_Parameters_Measure.request includes "Original Timestamp," which is a timestamp indicating the transmission time, "Receive Timestamp," which is a timestamp indicating the reception time, and "Transit Timestamp," which is a timestamp indicating the forwarding time.

FIG. 7B is a diagram showing an example of Link_QoS_Parameters_Measure.confirm. In steps S117 to S120 of FIG. 5, Link_QoS_Parameters_Measure.confirm is transmitted and received. In the example of FIG. 7B, the format of Link_QoS_Parameters_Measure.confirm is substantially the same as that of Link_QoS_Parameters_Measure.request.

FIG. 8A is a table showing an example of Link_QoS_Parameters_Measure_Result.indication. In steps S121 to S124 of FIG. 5, Link_QoS_Parameters_Measure_Result.indication is transmitted and received.

In the example of FIG. 8A, Link_QoS_Parameters_Measure_Result.indication includes LinkQoSParametersMeasuredList, which is a list of the results of the measurement of the radio communication quality or the network communication quality. LinkQoSParametersMeasuredList is classified into types shown in FIG. 8B. As shown in FIG. 8C, values indicating the results of the measurement of the radio communication quality or the network communication quality are listed for the respective classified types.

(5) Effects and Advantages

As described above, when handover is determined to be executed, the message transmitter-receiver 131 of the radio terminal 100 transmits and receives IEEE 802.21 messages to and from the radio base station PoA2 (second radio base station) before the IP address acquisition unit 152 acquires a new IP address (CoA). Then, the quality measurement unit 132 measures the radio communication quality by using the IEEE 802.21 messages transmitted and received by the message transmitter-receiver 131.

Accordingly, it is possible to provide a radio terminal 100 capable of measuring a radio communication quality prior to acquisition of a new IP address when the radio terminal 100 is assigned the new IP address at the time of handover.

In particular, the radio terminal 100 can measure a radio communication quality prior to acquisition of a new IP address when the radio terminal 100 executes handover between radio communication networks of different radio communication schemes (EV-DO network 1 and WiMAX network 2).

According to this embodiment, an IEEE 802.21 message includes information on at least one of the transmission time at which the IEEE 802.21 message is transmitted and the reception time at which the IEEE 802.21 message is received. In addition, the quality measurement unit 132 measures the radio communication quality on the basis of a difference between the transmission time and the reception time.

According to this embodiment, the message transmitter-receiver 131 of the radio terminal 100 transmits an IEEE 802.21 message requesting measurement of a network communication quality to the radio base station PoA2, and receives an IEEE 802.21 message informing of the result of the measurement of the network communication quality from the radio base station PoA2. Then, the quality measurement unit 132 of the radio terminal 100 determines the overall communication quality on the basis of the measured radio communication quality and the network communication quality informed by the radio base station PoA2.

Accordingly, the radio terminal 100 can comprehend not only the radio communication quality but also the network communication quality as well as the overall communication quality prior to acquisition of a new IP address.

According to this embodiment, the message transmitter-receiver 131 of the radio terminal 100 transmits an IEEE 802.21 message informing of at least one of the radio communication quality and the overall communication quality to the radio base station PoA2. Thus, the radio communication quality or the overall communication quality can be shared with the radio base station PoA2.

According to this embodiment, upon completion of establishing of the radio link L2 by the WiMAX link controller 116, the message transmitter-receiver 131 starts transmission and reception of IEEE 802.21 messages. In essence, although a radio communication quality and an overall communication quality cannot be measured until an IP layer handover is completed in a conventional method, the radio communication quality and the overall communication quality can be measured during the process of a link layer handover in this embodiment.

When handover is executed between radio communication networks of different radio communication schemes (EV-DO network 1 and WiMAX network 2), transmission delay and jitter change to a large extent before and after the handover. However, in this embodiment, a radio communication quality and an overall communication quality are measured during the process of a link layer handover, so that the size of a jitter buffer can be appropriately set in advance.

According to this embodiment, the message transmitter-receiver 231 of the radio base station PoA2 transmits and receives IEEE 802.21 messages to and from the radio terminal 100 before the radio terminal 100 acquires a new IP address (CoA). The quality measurement unit 232 measures a radio communication quality by using the IEEE 802.21 messages transmitted and received by the message transmitter-receiver 231.

Accordingly, it is possible to provide a radio base station PoA2 capable of measuring a radio communication quality before the radio terminal 100 acquires a new IP address when the radio terminal 100 is assigned the new IP address at the time of handover.

According to this embodiment, the message transmitter-receiver 231 of the radio base station PoA2 transmits an IEEE 802.21 message informing of the radio communication quality measured by the quality measurement unit 232 to the radio terminal 100 or the CN. Thus, the radio base station PoA2 can share the radio communication quality with the radio terminal 100 or the CN.

According to this embodiment, the message transmitter-receiver 231 of the radio base station PoA2 receives an IEEE 802.21 message requesting measurement of a network communication quality from the radio terminal 100. Then, the quality measurement unit 232 measures the network communication quality. The message transmitter-receiver 231 transmits an IEEE 802.21 message informing of the result of the measurement of the network communication quality to the radio terminal 100. Thus, the network communication quality can be informed to the radio terminal 100 in accordance with the request from the radio terminal 100.

[Second Embodiment]

In the following second and third embodiments, descriptions will be given of a case where an MIHF is not built into the CN and the home agent HA, so that a network communication quality cannot be measured by using the 802.21 framework. Note that, in the following second and third embodiments, descriptions will be given of points different from the first embodiment, and descriptions that overlap those of the first embodiment will be omitted.

Figure 9:
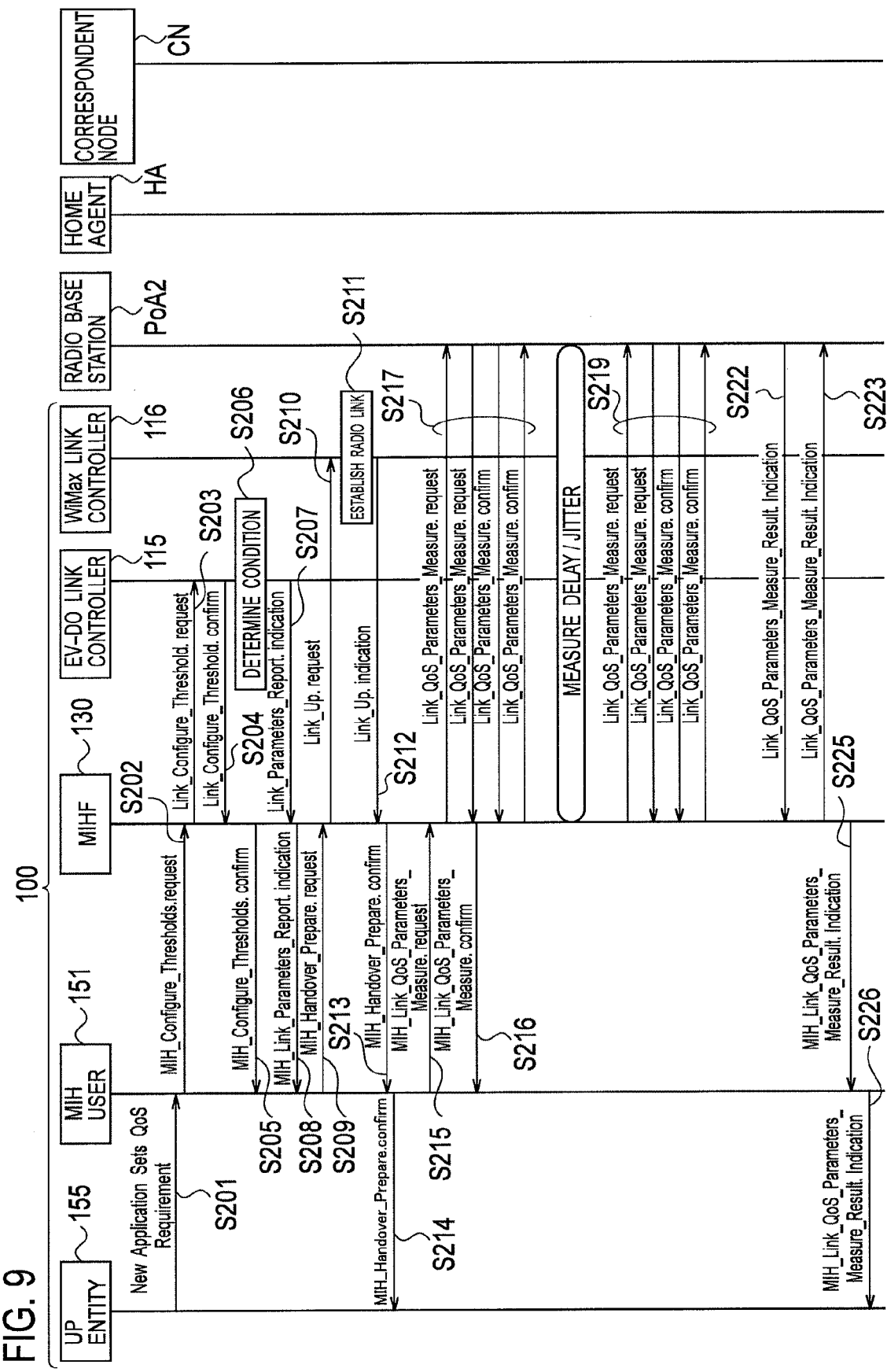
FIG. 9 is a sequence diagram showing an example of a detailed operation of a communication system according to a second embodiment of the present invention.

FIG. 9 is a flowchart showing an operation of a communication system according to the second embodiment. In the flowchart shown in FIG. 9, only a radio communication quality is measured, and a network communication quality is not measured.

Specifically, in steps S217 and S219, the MIHF 130 of the radio terminal 100 and the MIHF 230 of the radio base station PoA2 transmit and receive Link_QoS_Parameters_Measure.request requesting measurement of a radio communication quality and Link_QoS_Parameters_Measure.confirm indicating a result of the measurement of the radio communication quality to and from each other.

In step S222, the MIHF 130 of the radio terminal 100 informs the MIHF 230 of the radio base station PoA2 of Link_QoS_Parameters_Measure_Result.indication indicating the result of the measurement of the radio communication quality.

In step S223, the MIHF 230 of the radio base station PoA2 informs the MIHF 130 of the radio terminal 100 of Link_QoS_Parameters_Measure_Result.indication indicating the result of the measurement of the radio communication quality.

As described, the communication path between the radio base station PoA2 and the CN is a wired path, so that transmission delay and jitter are small. On the other hand, the communication path between the radio terminal 100 and the radio base station PoA2 is a radio path, so that transmission delay and jitter are large.

In essence, the transmission delay and the jitter between the radio terminal 100 and the radio base station PoA2 are dominant factors in determining the transmission quality between the radio terminal 100 and the CN. Thus, it is possible to measure only the transmission delay and the jitter (radio communication quality) between the radio terminal 100 and the radio base station PoA2 and to omit the measurement of the network communication quality between the radio base station PoA2 and the CN.

Alternatively, it is also possible to employ a configuration in which the radio base station PoA2 previously stores a network communication quality. Specifically, the radio base station PoA2 accumulates a network communication quality in the storage unit 260 shown in FIG. 4 for each CN or home agent, and then reuses the accumulated network communication quality. Moreover, the message transmitter-receiver 231 of the radio base station PoA2 informs the radio terminal 100 of an IEEE 802.21 message indicating a network communication quality previously stored in the storage unit 260 when receiving an IEEE 802.21 message requesting transmission of the network communication quality from the radio terminal 100.

[Third Embodiment]

Figure 10:
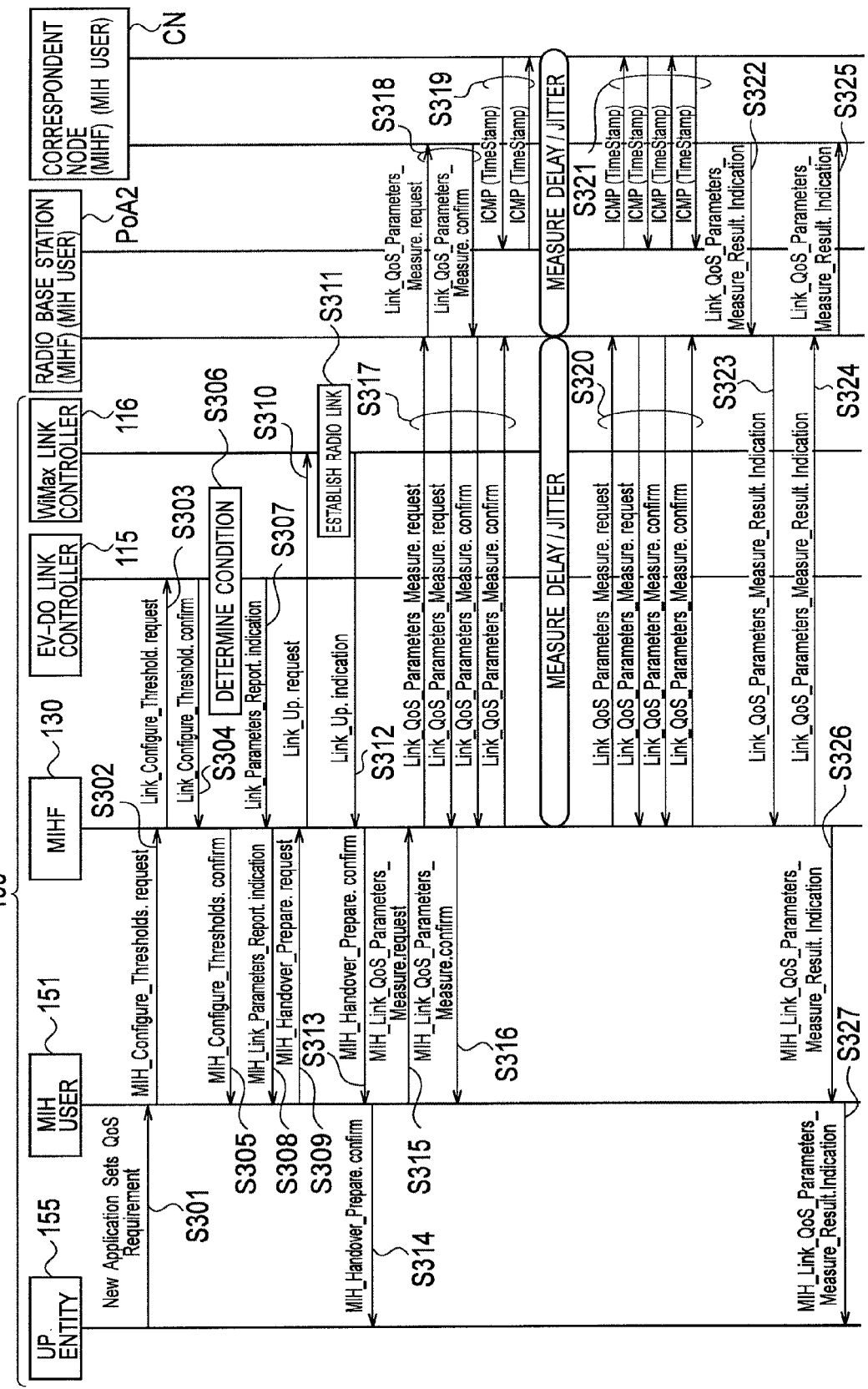
FIG. 10 is a sequence diagram showing an example of a detailed operation of a communication system according to a third embodiment of the present invention.

In the third embodiment, when not being able to be measured by using the 802.21 framework, a network communication quality is measured by using an ICMP packet, which is a type of an IP packet. FIG. 10 is a flowchart showing an operation of a communication system according to the third embodiment.

In step S317, the MIHF 230 of the radio base station PoA2, which has received a request for measurement of a network communication quality from the MIHF 130 of the radio terminal 100, requests the MIH user 251 of the radio base station PoA2 to measure the network communication quality between the radio base station PoA2 and the CN. In addition, in step S318, the MIHF 230 requests the MIHF 330 of the CN to measure the network communication quality between the CN and the radio base station PoA2.

The MIHF 330 of the CN having received the request for measurement requests the MIH user 351 of the CN to measure the network communication quality between the CN and the radio base station PoA2.

In steps S319 and S321, ICMP packets are transmitted and received between the MIH user 251 of the radio base station PoA2 and the MIH user 351 of the CN. Specifically, transmission delay and jitter are measured by using ICMP Time Stamp Request/Reply including a timestamp. The result of the measurement is informed to the MIHF from the MIH user.

As described above, according to the third embodiment of the present invention, when a network communication quality cannot be measured by using the 802.21 framework, it is possible to measure the network communication quality.

[Other Embodiments]

Although the present invention has been described through the aforementioned embodiments, the descriptions and drawings partially constituting this disclosure should not be understood to limit the scope of the present invention. From this disclosure, various alternative embodiments, examples, and operating techniques will be apparent for a person skilled in the art.

In the aforementioned embodiments, although the network communication quality refers to a communication quality between the radio base station PoA2 and the CN, a communication quality between the radio base station PoA2 and the home agent HA may be used as the network communication quality. For example, in the third embodiment, when the CN filters ICMP packets, the communication quality between the radio base station PoA2 and the CN cannot be measured. To address this problem, the communication quality between the radio base station PoA2 and the home agent HA can be alternatively used as the network communication quality. In this case, the MIH user 151 of the radio terminal 100 informs the MIHF 130 of the IP address of the home agent HA.

In the aforementioned embodiments, although the descriptions are given of handover to be executed between the EV-DO network 1 and the WiMAX network 2, the present invention can be applied to handover between any two radio communication networks using different radio communication schemes.

Moreover, a new IP address may be assigned in some cases in handover between sub networks in the same radio communication network, in addition to handover between radio communication networks using different radio communication schemes. For this reason, the present invention is also applicable to handover in the same radio communication network.

As described, it should be understood that the present invention includes various embodiments not listed herein. Accordingly, the technical scope of the present invention is only defined by the specific subject matters of the invention according to the scope of the invention as defined by the appended claims appropriate for this disclosure.

What is claimed is:

1. A radio terminal comprising:
   a communication processor configured to execute communications using an IP address with a correspondent node via a first radio base station;

an IP address acquisition unit configured to acquire a new IP address at a time of handover from the first radio base station to a second radio base station, the new IP address being used for communications with the correspondent node via the second radio base station;

a message transmitter-receiver configured to transmit and receive a lower layer message using a protocol of a layer lower than an IP layer to and from the second radio base station before the IP address acquisition unit acquires the new IP address; and a quality measurement unit configured to measure a radio communication quality including at least one of transmission delay and jitter in a radio communication path between the radio terminal and the second radio base station, by using the lower layer message transmitted and received by the message transmitter-receiver.

2. The radio terminal according to claim 1, wherein the lower layer message includes information on any one of a transmission time at which the lower layer message is transmitted and a reception time at which the lower layer message is received, and the quality measurement unit measures the radio communication quality on the basis of a time lag between the transmission time and the reception time.

3. The radio terminal according to claim 1, further comprising:

a quality determination unit configured to determine an overall communication quality including at least one of transmission delay and jitter in an overall communication path between the radio terminal and the correspondent node, wherein the message transmitter-receiver transmits the lower layer message to the second radio base station, the lower layer message requesting measurement of a network communication that includes at least one of transmission delay and jitter in a communication path between the second radio base station and the correspondent node, the message transmitter-receiver receives the lower layer message from the second radio base station, the lower layer message informing of a result of the measurement of the network communication quality, and the quality determination unit determines the overall communication quality on the basis of the radio communication quality measured by the quality measurement unit and the network communication quality informed by the second radio base station.

4. The radio terminal according to claim 3, wherein the message transmitter-receiver transmits the lower layer message to the second radio base station, the lower layer message informing of any one of the radio communication quality measured by the quality measurement unit and the overall communication quality determined by the quality determination unit.

5. The radio terminal according to claim 1, further comprising:

a link establishing unit configured to establish a radio link with the second radio base station by using a protocol of a link layer before the IP address acquisition unit acquires the new IP address, wherein the message transmitter-receiver starts transmission and reception of the lower layer message upon completion of the establishing of the radio link by the link establishing unit.

6. The radio terminal according to claim 1, wherein the IP address acquisition unit acquires the new IP address at the time of handover executed between radio communication networks using different radio communication schemes.

7. The radio terminal according to any one of claims 1 to 6, wherein the protocol used for transmitting and receiving the lower layer message is a protocol defined in IEEE 802.21.

8. A radio base station being a target for handover by a radio terminal that executes communications using an IP address with a correspondent node and also acquires a new IP address at a time of handover from another radio base station to the radio base station, the radio base station comprising:

a message transmitter-receiver configured to transmit and receive a lower layer message using a protocol of a layer lower than an IP layer to and from the radio terminal before the radio terminal acquires the new IP address; and a quality measurement unit configured to measure a radio communication quality including at least one of transmission delay and jitter in a radio communication path between the radio terminal and the radio base station, by using the lower layer message transmitted and received by the message transmitter-receiver.

9. The radio base station according to claim 8, wherein the lower layer message includes information on any one of a transmission time at which the lower layer message is transmitted and a reception time at which the lower layer message is received, and the quality measurement unit measures the radio communication quality on the basis of a time lag between the transmission time and the reception time.

10. The radio base station according to claim 8, wherein the message transmitter-receiver transmits the lower layer message to any one of the radio terminal and the correspondent node, the lower layer message informing of the radio communication quality measured by the quality measurement unit.

11. The radio base station according to claim 8, wherein the message transmitter-receiver receives the lower layer message from the radio terminal, the lower layer message requesting measurement of a network communication quality including at least any one of transmission delay and jitter in a communication path between the radio base station and the correspondent node, the quality measurement unit measures the network communication quality when the message transmitter-receiver receives the lower layer message requesting the measurement of the network communication quality from the radio terminal, and the message transmitter-receiver transmits the lower layer message to the radio terminal, the lower layer message informing of a result of the measurement of the network communication quality measured by the quality measurement unit.

12. The radio base station according to claim 11, wherein the quality measurement unit measures the network communication quality by using any one of the lower layer message and an ICMP packet.

13. The radio base station according to claim 8, further comprising:

a quality storage unit configured to previously store a network communication quality including at least one of transmission delay and jitter in a communication path between the radio base station and the correspondent node, wherein the message transmitter-receiver transmits the lower layer message, informing of the network communication quality previously stored in the quality storage unit, to the radio terminal upon receipt of the lower layer message requesting transmission of the network communication quality from the radio terminal.

14. The radio base station according to any one of claims 8 to 13, wherein the protocol used for transmitting and receiving the lower layer message is a protocol defined by IEEE 802.21.

15. A radio communication method comprising the steps of:
- executing, at a radio terminal, communications using an IP address with a correspondent node via a first radio base station;
- acquiring, at the radio terminal, a new IP address at a time of handover from the first radio base station to a second radio base station, the new IP address used for communications with the correspondent node via the second radio base station;
- transmitting and receiving a lower layer message using a protocol of a layer lower than an IP layer between the radio terminal and the second radio base station before the radio terminal acquires the new IP address; and
- measuring a radio communication quality including at least one of transmission delay and jitter in a radio communication path between the radio terminal and the second radio base station, by using the lower layer message transmitted and received in the step of transmitting and receiving the lower layer message.

* * * * *